(12) United States Patent
Murphy

(10) Patent No.: US 10,156,280 B2
(45) Date of Patent: Dec. 18, 2018

(54) CONTROL VALVE TO PERMIT ADJUSTABILITY OF A SHOCK ABSORBER

(71) Applicant: PUSH INDUSTRIES, INCORPORATED, Loveland, CO (US)

(72) Inventor: Darren W Murphy, Fort Collins, CO (US)

(*) Notice: Subject to any disclaimer, the term of this patent is extended or adjusted under 35 U.S.C. 154(b) by 0 days.

(21) Appl. No.: 14/848,911

(22) Filed: Sep. 9, 2015

(65) Prior Publication Data

US 2016/0069415 A1    Mar. 10, 2016

Related U.S. Application Data

(60) Provisional application No. 62/048,236, filed on Sep. 9, 2014.

(51) Int. Cl.
*F16F 9/50* (2006.01)
*F16F 9/34* (2006.01)
*F16F 9/44* (2006.01)

(52) U.S. Cl.
CPC .......... *F16F 9/50* (2013.01); *F16F 9/34* (2013.01); *F16F 9/44* (2013.01)

(58) Field of Classification Search
CPC .......... F16F 9/065; F16F 9/3242; F16F 9/325; F16F 9/44; F16F 9/443; F16F 9/446; F16F 9/50
See application file for complete search history.

(56) References Cited

U.S. PATENT DOCUMENTS 2,621,886 A * 12/1952 Mueller ............. F16K 5/0414
                                                137/625.42
4,958,706 A     9/1990 Richardson et al.
(Continued)

OTHER PUBLICATIONS

Advance E-Mail, PCT Notification Concerning Transmittal of International Preliminary Report on Patentability (Chapter 1 of the Patent Cooperation Treaty).
(Continued)

*Primary Examiner* — Anna M Momper
(74) *Attorney, Agent, or Firm* — E. Victor Indiano; Indiano & McConnell, LLC

(57) ABSTRACT

A controller adjusts the damping characteristics of a vehicle shock absorber that includes a shock absorber housing and a shock absorber fluid contained within the shock absorber housing. The controller includes a controller housing having a fluid passageway therein. The housing includes a shock coupler for coupling the housing for the shock absorber and for placing the shock absorber housing in fluid communication with the fluid passageway. A reservoir stores shock absorber fluid in the controller and a first valve is disposed in the fluid passageway between the shock coupler and the reservoir. Shock absorber fluid can pass between the shock coupler and the reservoir. The first valve includes a first valve controller that is configured for controlling the rate of flow through the first valve to achieve a first damping rate. A second valve includes a second valve controller for controlling the flow of shock absorber fluid through the second valve to achieve a second damping rate. A flow director directs the flow of shock absorber fluid to either the first valve or the second valve to achieve one of the first or second damping rates. The flow controller of the first valve controls the flow of shock absorber fluid to achieve the first damping rate independently of the second valve's control of (Continued)

the flow of shock absorber fluid to achieve the second damping rate.

20 Claims, 7 Drawing Sheets

(56) References Cited

U.S. PATENT DOCUMENTS

| | | | |
|---|---|---|---|
| 6,112,868 A | 9/2000 | Graham et al. | |
| 6,382,370 B1 | 5/2002 | Girvin | |
| 6,491,146 B1* | 12/2002 | Yi | B62K 25/04 |
| | | | 188/319.2 |
| 8,807,542 B2* | 8/2014 | Galasso | F16F 9/065 |
| | | | 188/266.3 |
| 2003/0038411 A1 | 2/2003 | Sendrea | |
| 2010/0308516 A1* | 12/2010 | Galasso | F16F 9/06 |
| | | | 267/64.15 |
| 2012/0255822 A1* | 10/2012 | Ito | F16F 9/325 |
| | | | 188/314 |
| 2014/0008161 A1 | 1/2014 | Cox | |
| 2014/0265203 A1* | 9/2014 | Zuleger | B60G 13/06 |
| | | | 280/124.16 |
| 2015/0211595 A1* | 7/2015 | Ikeda | F16F 9/34 |
| | | | 188/314 |
| 2015/0323035 A1* | 11/2015 | Coaplen | F16F 9/44 |
| | | | 188/269 |

OTHER PUBLICATIONS

PCT International Preliminary Report on Patentability (Chapter 1 of the Patent Cooperation Treaty).

QA1 Shock Comparison: Which to Choose—Single vs. Double Adjustable: Dragzine. Posted on Apr. 22, 2014 by Michael Harding. Retrieved from the Internet on Nov. 7, 2015. http://www.dragzine.com/tech-stories/brakes-suspension/qa1-shock-comparison-which-to-choose-single-vs-double-adjustable/.

* cited by examiner

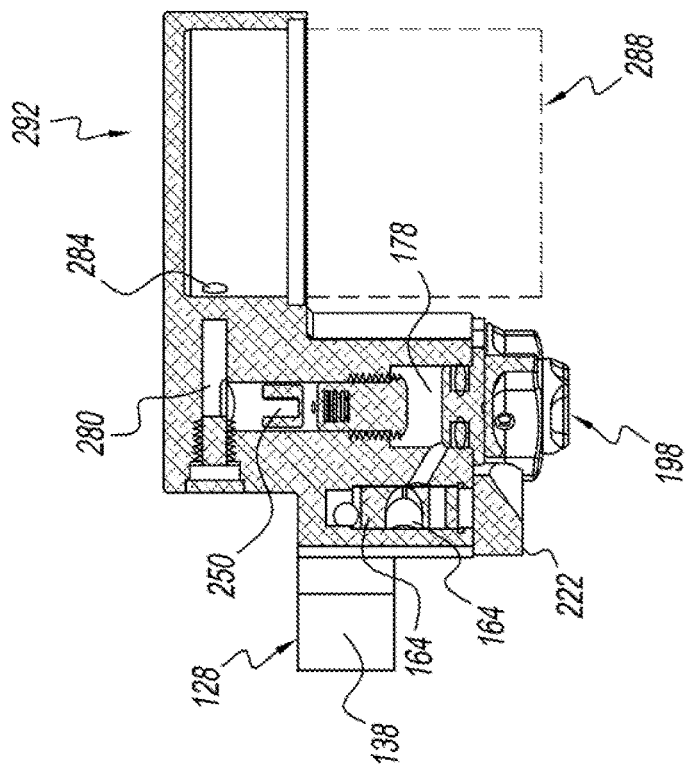
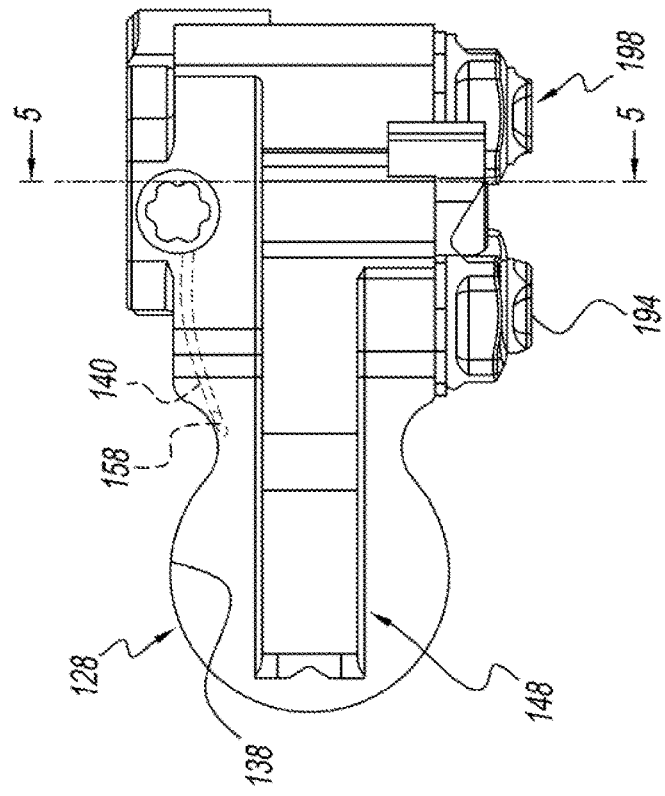

CONTROL VALVE TO PERMIT ADJUSTABILITY OF A SHOCK ABSORBER

PRIORITY CLAIM

The instant application claims benefit of priority to Darren Murphy U.S. Provisional Patent Application Ser. No. 62/048,236 that was filed on 9 Sep. 2014, and which is fully incorporated herein by reference.

I. TECHNICAL FIELD OF THE INVENTION

The present invention relates to shock absorbers for vehicles and more particularly to a shock absorber damping controller that enables the user to adjust the compression damping force of the shock absorber, to thereby adjust the ride characteristics of the vehicle.

II. BACKGROUND OF THE INVENTION

Shock absorbers are used in vehicles such as automobiles, motorcycles, bicycles, farm equipment, trucks and aircraft to improve the ride, handling or landing characteristics of such vehicles. A vehicle suspension system enables a wheel to travel with respect to the frame to provide cushioning and absorb shock. A shock absorber provides damping to this movement to help to reduce the velocity of these movements.

Typically, a shock absorber comprises a cylindrical housing having a piston contained therein. In some shock absorbers, the piston has a head, and fluid (liquid or gaseous) is placed within the interior of the shock absorber housing on both sides of the piston head. The piston head may contain one or more valve members that can be as simple as apertures that extend through the piston head.

As the piston head moves axially within the cylindrical housing shaft, fluid is moved from one side of the piston head to the other side of the piston head by traveling through the valve (e.g. the apertures that extend through the piston head). Because the fluid must pass through the valve or holes, the speed of the piston's axial movement is reduced or "damped" as it moves axially within the cylindrical housing. The restriction of fluid caused by the valves impedes the movement of the piston and thus serves to serve to slow the speed of the travel of the piston. Alternately, a solid head piston can be employed, and a separate valve system be used.

It is possible to control the amount of damping force by varying the size of the orifice in the valve that controls the rate at which the fluid can flow from the first reservoir on one side of the piston, through the piston head and to the reservoir on the other side of the piston.

It has been found and has been known that one can adjust the size of valve opening to achieve different damping forces. For example, if a relatively small damping force is desired, one would allow the valve to have a relatively large orifice to thereby allow a relatively high rate of fluid to pass through the valve. Such a low damping force would cause relatively less impedance of the piston's ability to move axially within the cylindrical shock absorber housing and therefore provide less impedance to the velocity of the travel of the wheel relative to the frame. A relatively low damping force would tend to provide a relatively "softer", less choppy ride for the vehicle.

On the other hand, increasing the damping force provides for a "stiffer", more choppy ride by providing for slower travel of the wheel and piston within the cylindrical housing by providing the piston (or other valve) with a smaller orifice that thereby decreases the rate at which fluid is able to flow through the piston.

There are certain times when one desires to vary the damping of a particular shock absorber that is mounted on a vehicle, so that the shock absorber itself can be "tuned" and varied between a relatively high damping force and a relatively low damping force. One instance where this occurs is in connection with mountain bicycles and off-road motorcycles.

A mountain bike rider often wishes to vary the damping force to better match the conditions of the particular trails on which she is riding and the direction and speed at which she is traveling on a trail. For example, unless the rider is looking for extreme comfort, the rider should set the shock absorber to have a relatively high damping force (relatively greater resistance to movement) when the rider is on a relatively smooth riding surface since a stiffer ride allows the bicycle to operate more efficiently.

Cyclists on mountain bikes also often desire to employ a relatively high damping forces when riding a bicycle uphill. When the rider is riding uphill, he is typically traveling at a relatively slow rate, when compared to the speed at which the rider rides downhill. Therefore, when riding uphill, most riders seek to have a relatively higher damping force and higher efficiency, as they are not as concerned about making the bumps softer.

However, high damping forces are not as desirable when the rider is traveling over an extremely rough surface or when the rider is riding downhill. When the rider is riding downhill, she hits bumps and obstacles at a higher speed, that thereby induce greater impacts on the bike, and greater "shocks" on the rider and the bike. To help reduce this heightened shock and force, the user can decrease the damping force so that the wheels may travel relatively further (when the same force is applied to the wheel), and with less resistance when compared to when a high damping force is utilized.

Viewed another way, a bike is generally more efficient when the damping force is increased. The higher efficiency occurs because the movement of the rider when turning the pedals and crank (especially when doing so vigorously), and moving his weight on the bike can cause rider-induced suspension movement. This rider-induced suspension movement lowers the efficiency of the bicycle, as it decreases the amount of power transmitted to the wheels for a given amount of force to the pedals applied by the rider.

However, on a downhill run or rocky terrain, the suspension induced movements are likely to be less of a factor because the rider is less likely to be as vigorously pounding on the pedals to move the bike. Additionally, the desire to absorb the forces caused by the rocks, fallen trees and other obstacles hit by the bicycle at higher speeds when going downhill often outweighs the benefits of increased efficiency.

Preferably, the rider can adjust the damping force during a particular ride. It would therefore be useful to provide a device that enables the rider to adjust the shock absorber's damping force. Currently, such adjustability exists, but is limited.

One known adjustable shock absorber provides dials on the shock absorber that enable the user to adjust the dials to achieve his desired damping force. Unfortunately, the use of this particular device has significant drawbacks. In particular, the rider is usually required to stop riding long enough to adjust the dials to vary the damping. This required stop and/or the difficulty that exists to change the dial which riding costs the rider valuable time and therefore is undesirable to competitive riders.

Therefore, one object of the present invention is to provide the rider with a damping force controller that permits the user to make "on the fly" adjustments to the compression damping force.

Another difficulty experienced with known prior art adjustable damping systems is that even though prior art shock absorbers were adjustable between a "relatively stiff" and "relatively loose" (or relatively high damping compressive force and relatively low damping compressive force) positions, the high and the low settings were coupled to each other so that one could not adjust the compressive force when in the high compressive force range independently from the force at the low compressive force range. This coupling occurs because the known prior art devices use a single valve.

In order to move the valve from the high compressive force range to the low compressive force range, known devices employed a bypass path that was selectively opened to provide a second path for the fluid to flow from one side of the valve to the other. The second fluid path is in addition to the first, primary through-the-valve path that is open all the time, both during the high compressive force setting and in the low compressive force setting. During the high compressive force setting, the bypass valve is closed. When the user desires to move the valve to the lower compressive force setting, the user opens the bypass valve to provide a second fluid flow path and hence provide for a greater flow rate capacity.

Typically, known bypass valves have a non-adjustable, fixed size that permit a fixed fluid flow rate to flow through the bypass valve when the bypass valve is opened. As such, the combined fluid flow through the valve when adjusted into the low compressive force setting equals the flow rate through the first valve, flow path plus the flow rate through the second flow path provided by the bypass.

As such, if one adjusts the flow rate through the first, primary valve so that the valve is set to provide a very high compressive force to thereby provide a very "stiff" suspension, opening the bypass valve will provide a relatively looser spring or lower compressive force. Nonetheless, the combined lower compressive force would still result in a relatively stiff lower compressive force because the combined flow through the primary and bypass valve would still be relatively low because of the low fluid flow rate through the primary valve. In particular since the setting of the primary compression force valve has not and cannot not be) changed from its "stiff" setting, the fluid flow contribution from the primary value is relatively low and the combined fluid flow from both the primary and bypass valves is still relatively low.

As such, the overall effect of such an arrangement is to provide the shock absorber with a relatively high compression damping force, even though the shock is set in the low damping force range. When so set, the bike will have a ride, that while "softer" than when in the "high compression force" setting, is still relatively stiff. Such a ride is characterized as having a "low bump sensitivity". Low bump sensitivity generally refers to a condition where because of the stiffness of the spring, the wheel and shock absorber do not move much when the wheel hits a small obstacle, such as a twig, rock or the like, that generally leads to a relatively uncomfortable but efficient ride.

On the other hand, if the user wanted a more comfortable ride when in the lower damping setting, he would employ components that created a compressive force of the primary valve that was designed to achieve at a relatively lower damping force. Although this arrangement provides the user with increased "bump sensitivity" and a softer ride, it also provides the user with a softer ride when the bypass valve is closed because the primary compressive valve is still set to allow more fluid to flow there through, when compared to when the valve is set at a relatively higher compressive force rate. As such, in order to achieve a softer ride downhill, the user has to endure a softer, less efficient ride uphill.

In summary, the known prior art devices are not readily capable of allowing the user to adjust the uphill and downhill compressive forces of the shock absorber independently of each other, since the mechanisms are tied together. As such, the compressive force of the uphill setting and downhill setting are dependent upon each other.

One object of the present invention is to provide a device that allows the uphill compressive force setting to be adjusted independently of and not be dependent upon, the adjustment of the downhill damping compressive force.

III. SUMMARY OF THE INVENTION

In accordance with the present invention, a controller adjusts the damping characteristics of a vehicle shock absorber that includes a shock absorber housing and a shock absorber fluid contained within the shock absorber housing. The controller includes a controller housing having a fluid passageway therein. The housing includes a shock coupler for coupling the housing for the shock absorber and for placing the shock absorber housing in fluid communication with the fluid passageway. A reservoir stores shock absorber fluid in the controller and a first valve is disposed in the fluid passageway between the shock coupler and the reservoir. Shock absorber fluid can pass between the shock coupler and the reservoir. The first valve includes a first valve controller that is configured for controlling the rate of flow through the first valve to achieve a first damping rate. A second valve includes a second valve controller for controlling the flow of shock absorber fluid through the second valve to achieve a second damping rate. A flow director directs the flow of shock absorber fluid to either the first valve or the second valve to achieve one of the first or second damping rates. The flow controller of the first valve controls the flow of shock absorber fluid to achieve the first damping rate independently of the second valve's control of the flow of shock absorber fluid to achieve the second damping rate.

Each of the first and second valves also includes an adjustment mechanism so that one can adjust the fluid flow rate, to thereby independently adjust the damping compression force rate of each of the first valve and second valves.

A user actuble fluid flow director is movable by a user between a first position wherein fluid is directed to flow through the first valve and a second position wherein fluid is directed to flow through the second valve.

In a preferred embodiment, one of the first and second valves is adjusted to provide for an appropriate fluid flow for a relatively high damping force environment, such as one would have when traveling uphill. The other of the first and second valves is adjusted to provide a relatively lower compressive force such as one would desire when traveling downhill, or across particularly rough pavement.

The fluid flow director can be "toggled" between directing the fluid flow to the first valve and directing fluid flow to the and second valve. In a hypothetical example, the rider would adjust the first valve to achieve the compression damping force desired in a "high damping force" condition, such as when the rider was riding on a smooth surface or uphill. Concurrently, the rider would adjust the second valve to achieve the compression damping force desired in a "low damping force" condition such as when the rider is riding downhill or over rough terrain. In this hypothetical, the rider would use the flow director to direct fluid flow through the first valve when riding up a hill to achieve the desired high compression force. Upon reaching the apex of the hill, the rider would move the lever to the second position to direct flow through the second valve on the fly and without stopping the bike or dismounting it.

The device is preferably designed so that the user can continue to flip the flow direction selector at his desire, to change the damping rate, while continuing to ride the bike. In the second damping force configuration (where the second valve is being employed) the device would be in the low damping force configuration which would give the rider a smoother ride downhill or over rough terrain These and other features of the present invention will be apparent to those skilled in the art upon a review of the drawings and detailed description presented below.

IV. BRIEF DESCRIPTION OF DRAWINGS

FIG. 4 is a top view of the damping compression force controller;

FIG. 5 is a sectional view taken along lines 5-5 of FIG. 4 and showing the reservoir in phantom.

V. DETAILED DESCRIPTION OF THE PREFERRED EMBODIMENT

Figure 2:
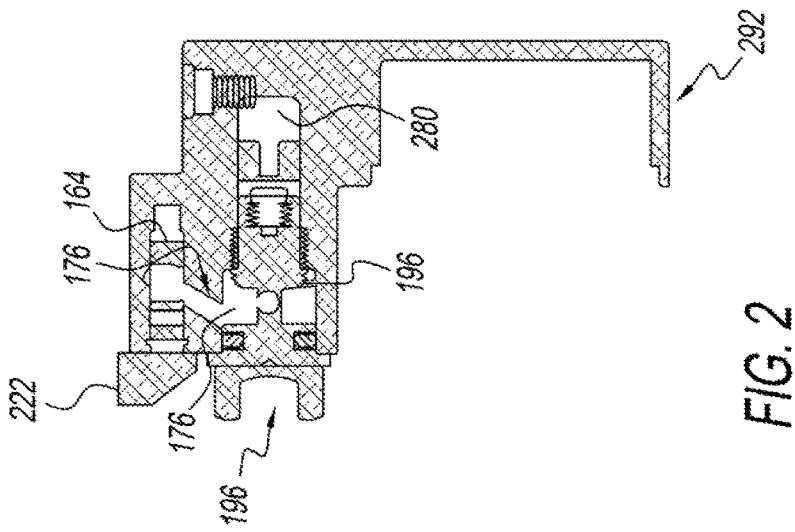
FIG. 2 is a sectional view taken along lines 2-2 of FIG. 1.

The description that follows describes, illustrates and exemplifies one or more particular embodiments of the present invention in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles.

The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing reference numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Furthermore, certain views are side views which depict only one side of the device (or one set of components of a multi set array of components), but it will be understood that the opposite side and other component sets may be identical thereto. The present specification is intended to be taken as a whole and interpreted in accordance with the principles of the present invention as taught herein and understood by one of ordinary skill in the art.

From the discussion in the Background above, one learns that the damping characteristics of a particular shock absorber are going to be strongly influenced by the amount of fluid that can flow through the valves or orifices of the shock absorber, as the ability of a shock absorber piston to travel a certain distance is dependent upon the amount of fluid that flows through the orifices or valves within the shock absorbers. As such, the greater the combined or aggregate size of the orifices within the shock absorber, the more quickly the piston can move for a given amount of force. One can vary the damping characteristics of a particular shock absorber by varying the size of the orifices. For example, if orifices having a relatively small aggregate area are used, the damping forces will be great, to thereby produce a very "stiff" ride. Conversely, the use of orifices having a large aggregate area will create low damping forces, that permits the piston to travel more quickly, and further distances, which thereby provides a softer, but less controlled ride.

However, the size of the orifices is not the only factor that controls the amount of fluid that can flow through the orifices. An additional factor that affects the rate of fluid flow through the orifices is the amount of sprung and unsprung weight of the vehicle to which the shock absorbers are attached. As will be appreciated, a great amount of weight will induce a greater amount of force on the shock absorbers when a "bump" is struck, thus forcing a greater amount of fluid flow through the orifices.

Additionally, the speed, or more appropriately, the force at which a particular item is struck, will affect the flow of the shock absorber fluid through the orifices. For example, a bicycle tire hitting a curb at 30 mph would create more force on the shock absorber, and create a greater amount of fluid flow through the orifice of a shock absorber than that same bicycle wheel hitting that same curb at only 5 mph.

As such, the term "damping rate" will be used to describe the various configurations that may be employed in a shock absorber to achieve different damping characteristics. In this regard, the mention of a "low damping" rate will tend to suggest that valves flow paths or orifices are used that have a relatively larger aggregate area, and that thereby permit a relatively larger rate of flow there through, for a given amount of force being exerted thereon. As such, "low damping rate" shock absorbers will tend to allow a large amount of travel of the piston and produce a relatively soft, but somewhat uncontrolled ride.

Conversely, the term "high damping rate" will tend to suggest that the configuration that employs relatively smaller aggregate orifice and flow path cross-sectional, which, for a given amount of force allows less fluid to flow there through than a similar shock absorber set up with a low damping rate. As such, one can expect that a high damping rate configuration would tend to result in a stiffer but more controlled ride, and with a bicycle, a more efficient transfer of power between the pedals and the bicycle.

Figure 1:
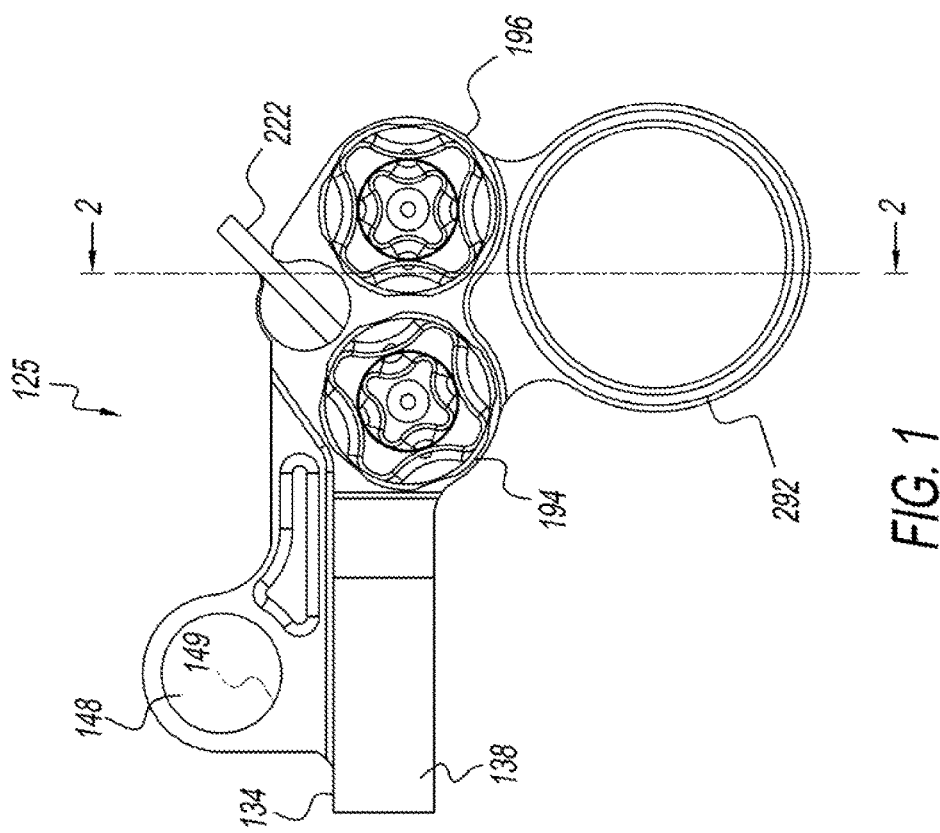
FIG. 1 is a side view of the damping compression force controller of the present invention.
Figure 1A:
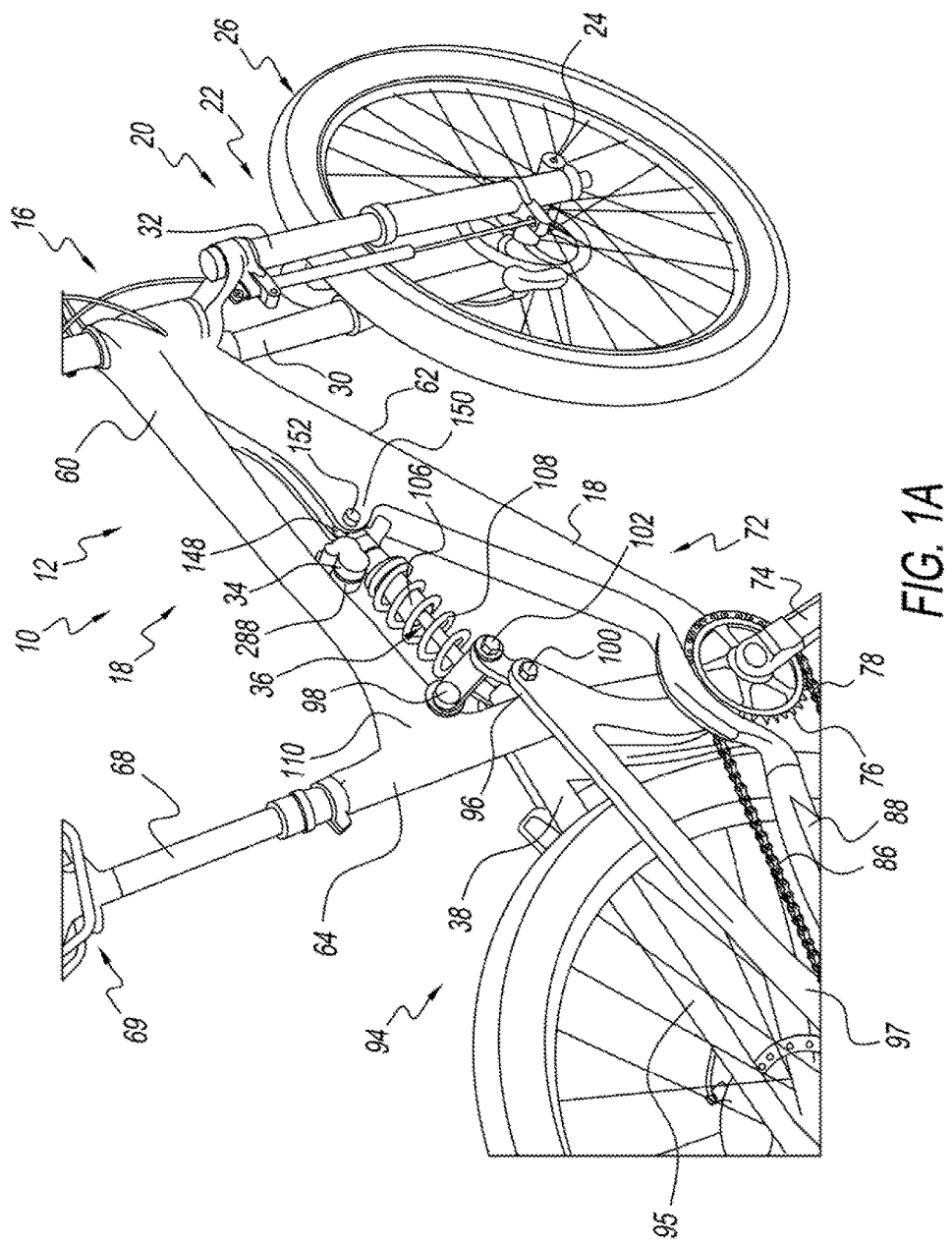
FIG. 1A is a perspective view of the damping compression force controller being mounted on a bicycle, and coupled to the rear shock absorber of the bicycle.
Figure 1B:
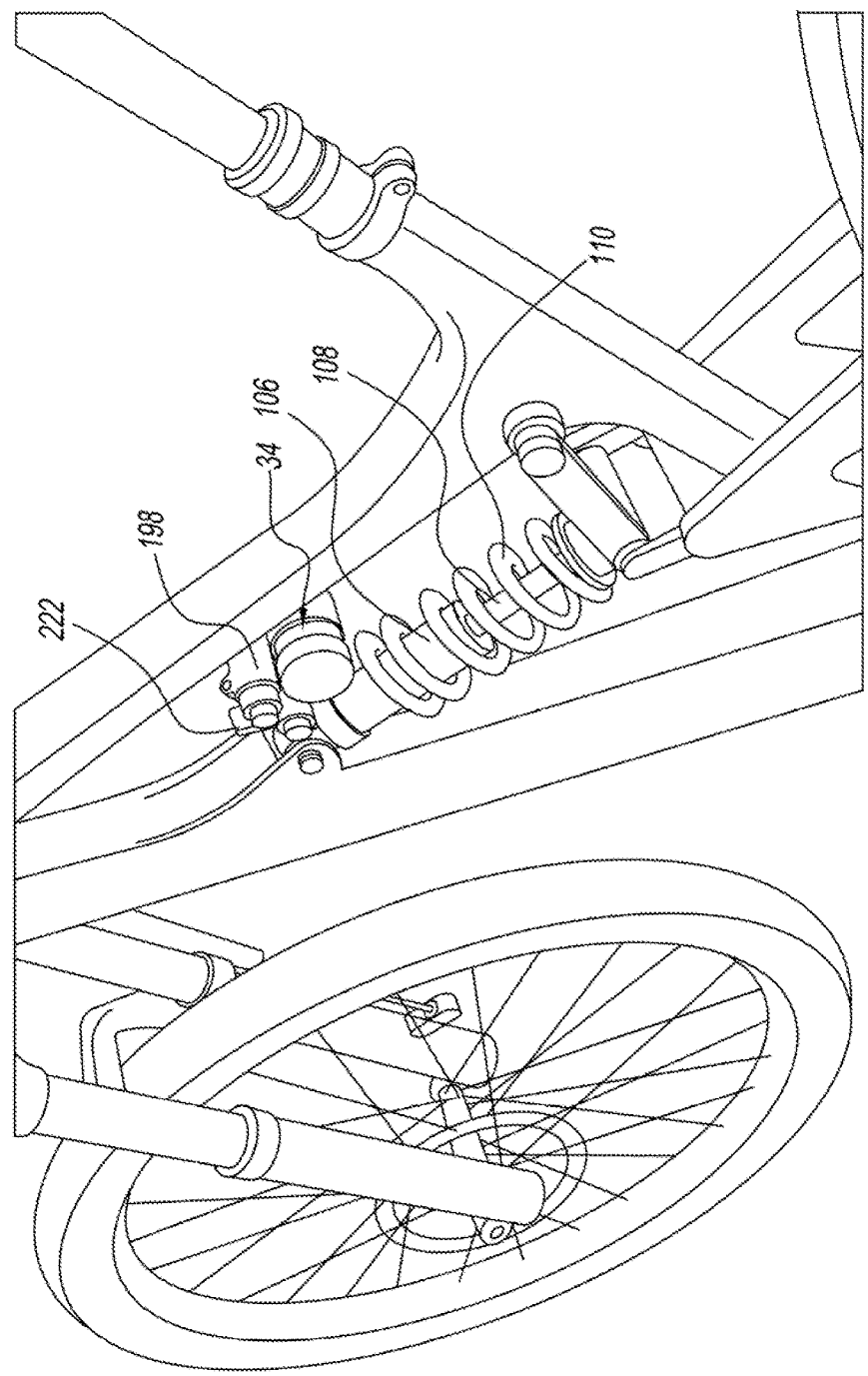
FIG. 1B is a perspective view, similar to FIG. 1, except taken from the other side of the bicycle, showing the damping compression force controller mounted onto the bicycle, it being noted that a data acquisition computer is mounted to the lower frame member of the bicycle.

Your attention is first directed to FIGS. 1A and 1B that show the device being mounted onto a bicycle. A typical bicycle 10 includes a frame 12. A mountain bike 10 will include a multi-part frame 10 that is articulated, such that some of the frame components can move with respect to each other.

The multipart frame 10 includes a main frame assembly 18, a rear bike frame assembly 38 and a front fork frame assembly 20. The main frame assembly 18 includes a front frame tube 16 that is connected to a downwardly extending fork 22 of the front fork assembly 20. The fork 22 includes a lower axle receiving bracket that engages the axle 24 of the front wheel 26. The front fork 22 comprises first 30 and second 32 parallel extending shock absorber type forks that enable the front wheel 26 to travel relative to the frame 10, and thereby cushion bumps. The wheels 26 travel relative to frame 10 along a path defined by the long axis of the shock absorbers of the first and second shock absorber containing forks 30, 32.

Although the damping compression force controller assembly 34 of the present invention is shown as being attached to the rear shock absorber 36 and to extend between the main frame assembly 18 and rear bike frame 38, it will be appreciated that it could also be adapted to attach to the front fork 22 to enable the user to adjust the compression force of the front shock absorbers.

The main frame assembly 18 of the bike 10 also includes an upper frame member 60, an angled lower frame member 62 and a generally vertically disposed rear frame member 64. The main frame assembly 18 further includes a rearwardly disposed pivot arm 98 that includes an upper end pivotably coupled to the upper frame member 60, and a lower end that is pivotably coupled to the rear frame assembly 82.

A bicycle seat post 68 for receiving a bicycle seat (not shown) thereon is adjustably coupled onto the upper end of the vertical member 64 of the main frame assembly 18. The bicycle seat includes a surface upon which the user sits. The lower frame member 62 extends downwardly and rearwardly from its proximal end at the front tube 16 down to its distal end at the crank assembly 76. The crank assembly 72 includes crank arms 74 to which the pedals (not shown) are attached and a geared cranking ring 76 to which the chain 78 is attached. The vertically extending rear frame member 64 is fixedly coupled such as by welding to the frame at a position adjacent to the crank.

There is also a rear frame assembly 38. The rear frame assembly 35 includes a first 86 and second 88 generally laterally extending lower members. The laterally extending lower members 86, 88 extend generally parallel with each other 86, 88 and laterally between the main frame assembly 18 and the rear sprocket 90. The rear frame assembly 38 also includes an upper frame member 94 that extends at an angle to the ground so that the forward end 96 of the upper frame member 94 is disposed between the upper 60 and lower 62 laterally extending members of the main frame assembly 18.

The upper frame member 94 includes first 95 and second 97 parallelly disposed arms that are coupled to each other 95, 97 at their proximal ends. The distal end of arm 95 is coupled to the distal end of first lower member 88; and the distal end of arm 97 is coupled to the distal end of second lower member 88. Additionally, a generally vertical pivot arm 98 is coupled between the upper member 94 and lower members 86, 88 of the rear frame assembly 82 near the front thereof.

The upper member 94 of the rear frame assembly 38 is pivotably coupled to the main frame assembly 18 by a first and a second pivot pin 100, 102. The first pivot pin 100 passes through a relatively rearwardly positioned eyelet that is formed in a riser that also serves as the pivot arm 98. The second pivot pin 102 passes through a relatively forwardly disposed eyelet in the lower portion of the riser/pivot arm 98 and also passes through a distal connecting eyelet of the shock absorber 36. Through this arrangement, the main frame assembly 18 and the rear frame assembly 82 are pivotably coupled together so that they may move with respect to each other.

The shock absorber 36 is coupled to each of the main 18 and rear 82 frame assemblies to control the relative movement thereof, and to provide a damping force as discussed above. The shock absorber 36 includes a second or distal end having an eyelet that is coupled to the pivot arm 98 and is thereby functionally coupled to the forward end of the first 95 and second 97 upper members of the rear frame assembly 60. The first or proximal end of the shock absorber 36 is coupled to the adjustable damping controller 34 of the present invention.

As shown in the drawing, the bike's 10 shock absorber 36 suspension includes a shock absorber having a cylindrical housing 106, and a radially extending piston 108 that includes a head (not shown) that can travel axially within the cylindrical housing 106. The operation of the shock absorber 36 itself is fairly conventional, and a further explanation of the manner in which shock absorbers for bicycles operate can be found at Harman, U.S. Pat. No. 4,881,750 dated 21 Nov. 1989 and Thorpe, U.S. Pat. No. 8,459,620 of 11 Jun. 2013, both of which are fully incorporated by reference herein. Additional information can be found at Wikipedia at https//en.wikipedia.org/wiki/bicycle_suspension.

The housing 106 is interiorly received by a surrounding spring 110 that extends between a radially outwardly extending rear spring seat disposed adjacent to the rearward end of the shock absorber 36, and a forward spring seat that is formed to extend radially outwardly from the cylindrical housing 106 at the proximal or forward end of the shock absorber 36.

The cylindrical housing 106 of the shock absorber 36 is adjustable in length to permit the user to vary the distance between the front and rear spring seats to thereby vary the effective length of the spring 110. This variability enables the rider to adjust the "pre-load" of the spring 110 on the bike 10 so that the user can obtain a desired ride height on the bike 10. This adjustment pre-loads the spring 110 to a desired compression to achieve this desired ride height.

The interior of the cylindrical housing 106 of the shock absorber 36 includes a reservoir that is disposed between the piston head (not shown) and the forward end of the shock absorber cylinder housing 106. This forwardly disposed interior portion of the shock absorber housing 106 comprises a reservoir into which fluid is stored. Unlike the description of the shock absorber given in the background, the shock absorber 36 does not include apertures in the piston. Rather, the valves that serve the shock absorber 36 are contained within the controller 34.

A controller 34 for adjusting the damping characteristics of a vehicle shock absorber 36 containing a shock absorber housing 106 and shock absorber fluid contained within the shock absorber housing 106, includes a controller housing 120 having a fluid passageway (e.g. 140, 158, 162, 168, 176, 186, 210 242, 280, 284) therein. The housing 120 includes a shock coupler 120 for coupling the housing 120 to the shock absorber housing 106 and for placing the shock absorber housing 106 in fluid communication with the fluid passageway. A reservoir 124 for is provided for storing a reservoir of shock absorber fluid in the controller 34.

A first valve 194 is disposed in the fluid passageway between the shock coupler 122 and the reservoir 124 through which shock absorber fluid can pass between the shock coupler 122 and the reservoir 124. The first valve 194 includes a first valve controller 264 configured for controlling the rate of flow through the first valve 194 to achieve a first damping rate.

A second valve 198 is disposed in the fluid passageway between the shock coupler 122 and the reservoir 124 through which shock absorber fluid can pass between the shock coupler 122 and the reservoir 124. The second valve 198 includes a second valve controller 266 for controlling the flow of shock absorber fluid through the second valve 198 to achieve a second damping rate. A flow director 164 is provided for directing the flow of shock absorber fluid to either the first valve 194 or the second valve 198 to achieve one of the first or second damping rates.

The flow controller 264 of the first valve 194 controls the flow of shock absorber fluid to achieve the first damping rate independently of the second valve's 198 control of the flow of shock absorber fluid achieve the second damping rate.

Preferably the first valve 194 includes a first valve flow path and a first adjuster 264 for controlling the flow of fluid in the first, first valve flow path. The first valve 194 also includes a second adjuster 270 for controlling the flow of fluid in the second first valve flow path. The first adjuster 264 is configured for adjustment independently of the second adjuster 270. The second adjuster 270 also is configured for adjustment independently of the first adjuster 264.

Your attention is now directed particularly to FIGS. 1, 1C and 2-6. The adjustable damping force (or rate) controller 34 of the present invention includes a controller housing 120 having a plurality of portions or components. As most of the housing 120 components are joined together into a single "entity," they will be referred to herein as portions, as the term components conveys more of a separable nature. Although the various portions are functionally separable insofar as they perform separate functions, they are generally mechanically unitarily joined. A plurality of other, separable components, e.g. valves 194, 198 are separately formed and assembled to the housing 120 to form the controller 34.

The controller 34 housing 120 includes three primary portions including the shock/frame connector portion 122 disposed at one end of the housing 120; a reservoir portion 124 disposed at the other end of the housing 120; and a valve portion 125 disposed between the reservoir portion 124 and the shock/frame connector portion 122.

Figure 1C:
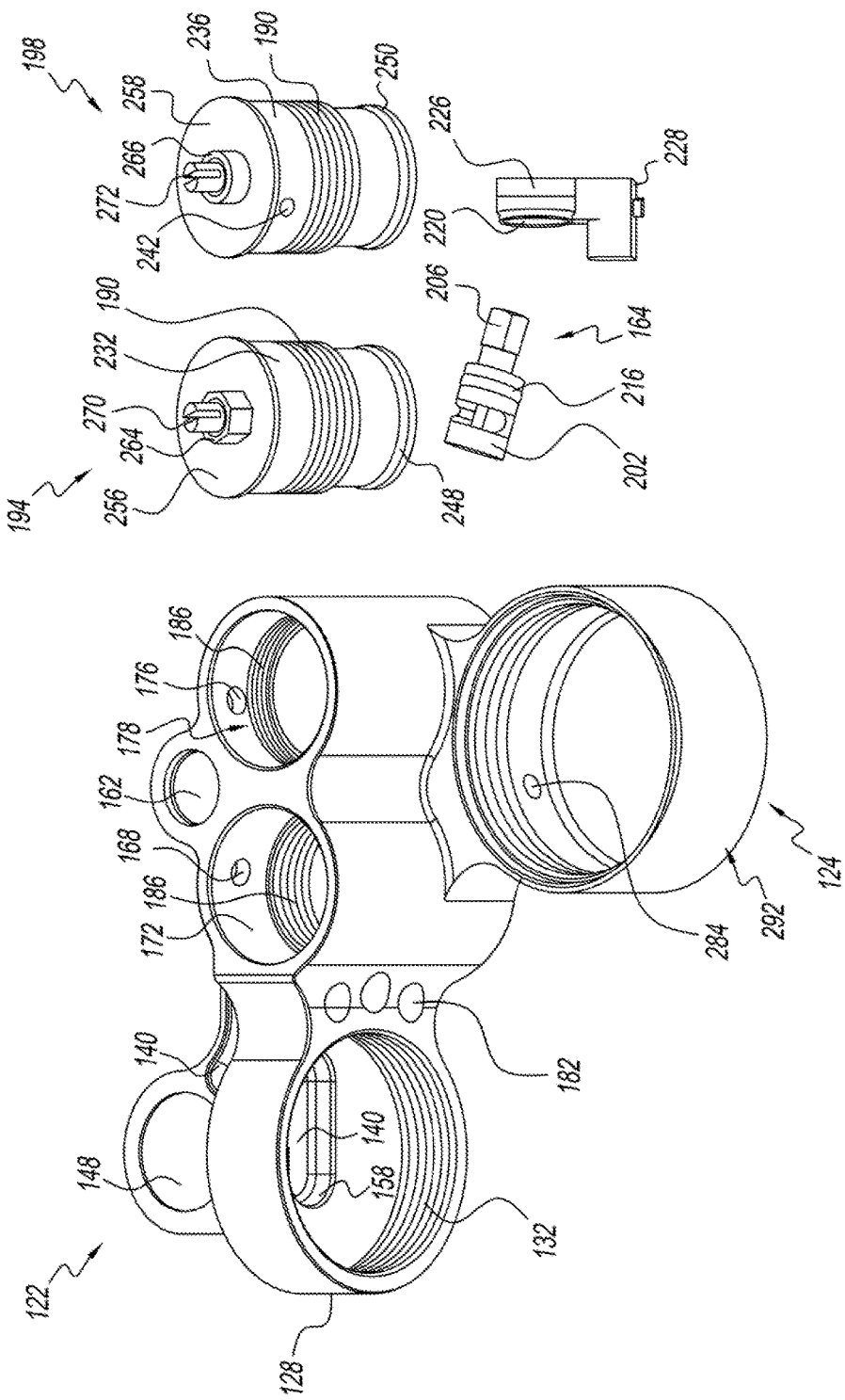
FIG. 1C is a perspective view of various components of the damping compression force adjustment device of the present invention in a dis-assembled condition.
Figure 3:
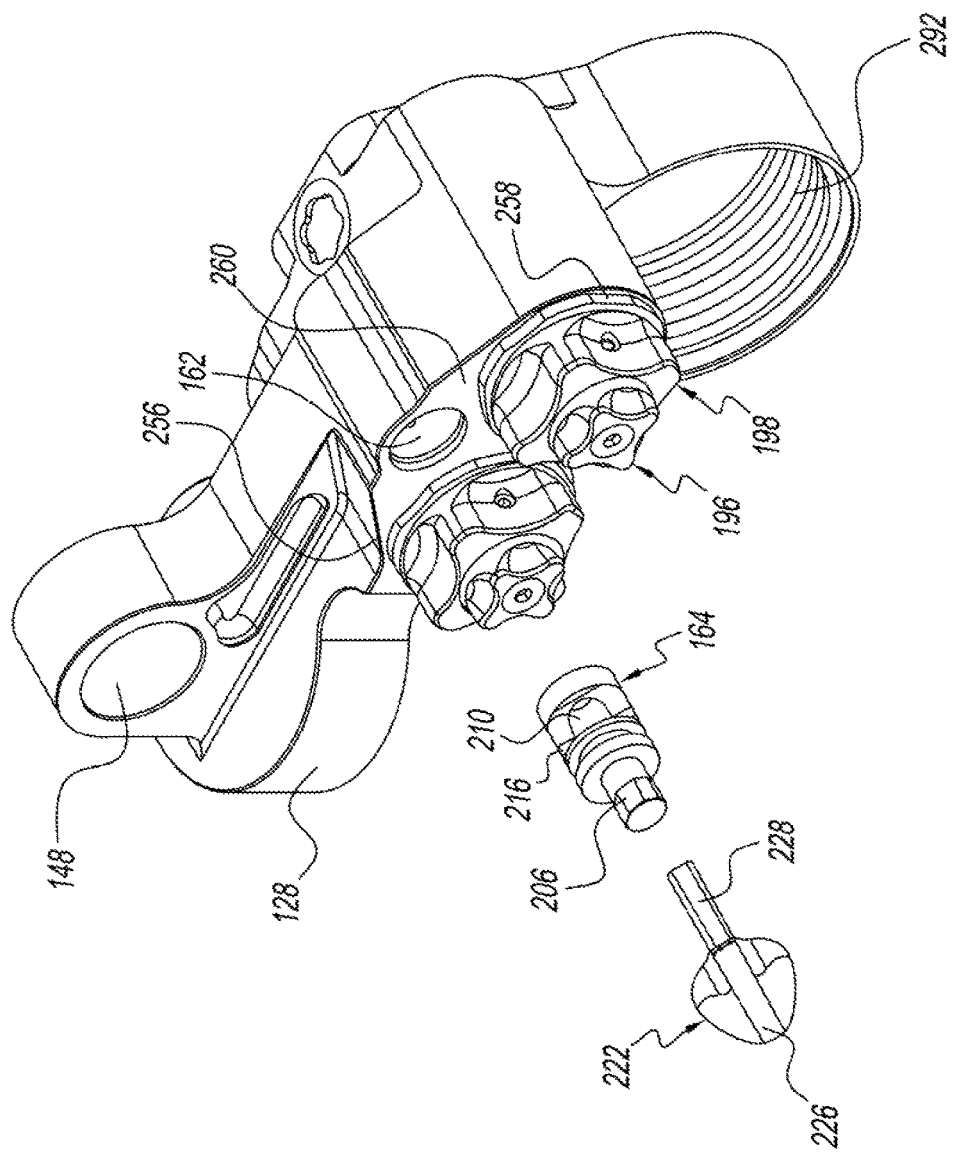
FIG. 3 is a side perspective view of the damping compression force controller of the present invention.
Figure 6:
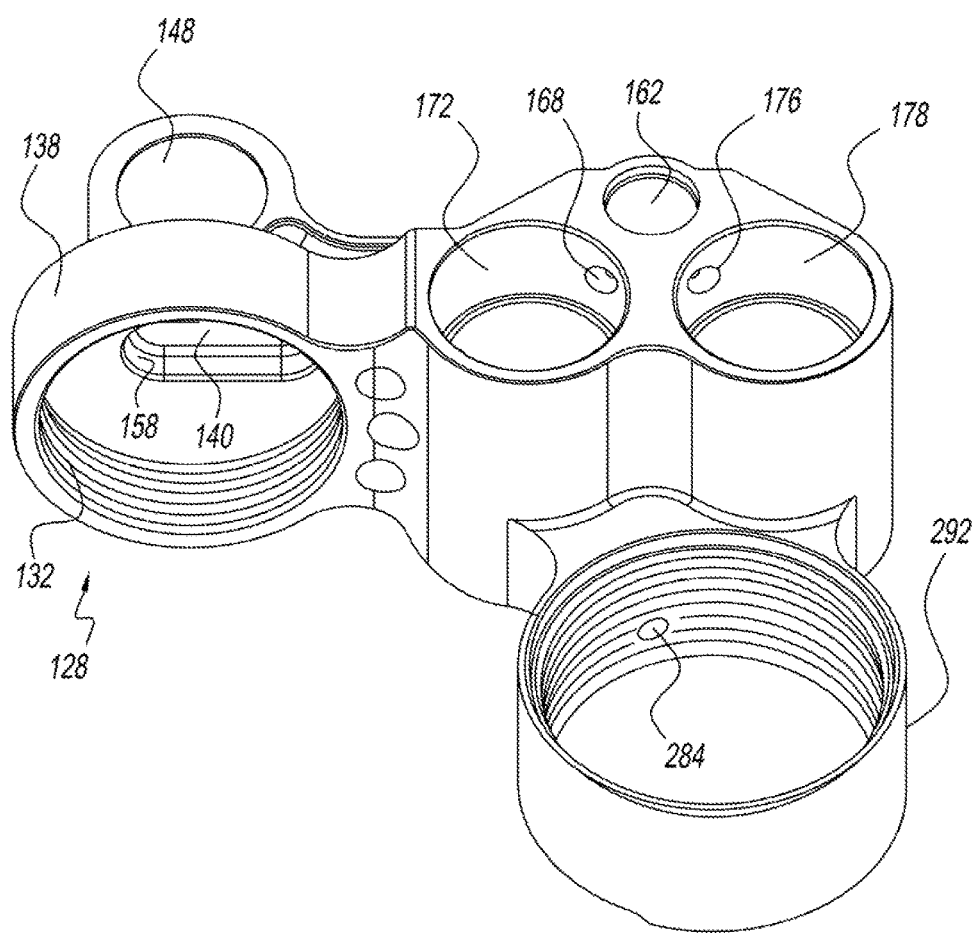
FIG. 6 is a bottom perspective view of the damping compression force controller of the present invention.

The shock/frame connector portion 122 includes a shock connector 128 and a frame connector 130. As shown in FIG. 1C, the shock connector portion 128 is generally ring like and has a configuration similar to a bottle cap that includes a cylindrical portion 138 and a radially extending disk-shaped end cap portion 134. The cylindrical portion 138 includes a radially interiorly facing female threaded surface 132. The female threads of the threaded interior surface 132 of the shock connector 128 are provided for threadedly engaging the corresponding male threads formed on the radially outwardly facing cylindrical surface of the second end of the shock absorber housing 120.

The diameter of the shock connector 128 is chosen to threadedly receive an appropriately sized shock absorber housing 120, and can be made in different sizes to accommodate different sized shock housings having different diameters.

Disposed above the shock connector is a pivot eyelet 148 having an aperture 149 through which the pivot pin 152 passes that connects the forward end of the shock absorber 36 to a pair of aligned apertures formed as a part of a shock absorber mounting bracket 150 that extends upwardly from the lower tube 62 of the main frame assembly 18. The pivot eyelet 148 is sized and positioned to snuggly receive the pivot pin 150 so that the controller 34 and shock 36 device can freely pivot while minimizing the "wobble" and free play on the pivot pin 152. An outlet aperture 158 is provided at the interior end of the shock connector 128 to permit fluid that flows into the interior of the shock connector to pass into the transfer port 140.

The transfer port 140 of the shock connector 128 is fluidly coupled to the fluid with the interior of the shock absorber housing 106 and hence the interior of the shock absorber 36, as the shock absorber housing 106 and the interior of the shock connector 128 and transfer port 140 are all in fluid communication with each other.

The fluid that flows from the absorber 36 shock connector 128 flows through outlet aperture 158 and into transfer port 140. The transfer port 140 is fluidly coupled to the barrel housing 162, that includes a cylindrical cavity 162 into which a fluid director or barrel 164 is fitted. The transfer port 140 is in fluid communication with both a first inlet 168 that provides a fluid passageway for fluid to flow into a first valve housing 172, and a second inlet 176 that provides a fluid flow passageway 178 into a second valve housing 178.

If the flow of fluid were to be unobstructed in the transfer port 140 and through the barrel housing 162, the fluid could flow into either or both of the first 168 and second inlets 176, and hence, into the first 172 and second 178 valve housings. The valve housings 172, 178 are similar to barrel housing 162, as the valve housings 172, 178 comprise cylindrical cavities that are sized and configured for receiving a fluid control member (valves 194, 198), as discussed in more detail below.

A series of three blind apertures 182 are disposed on the lower side surface adjacent to the shock connector opening. The blind apertures 182 do not serve any functional purpose insofar as no fluid flows through the blind apertures 182. Rather, the blind apertures 182 are machined out of the controller housing 120 as a weight saving measure.

The first 172 and second 178 valve housings each comprise radially inwardly facing cylindrical walls that define a generally cylindrical cavity. The cylindrical wall includes a female threaded portion 186 for receiving exterior threads 190 of the first 194 and second 198 valve members respectively. A first inlet 168 is disposed in the first valve housing 186 that is in fluid communication with the transfer port 140 and barrel housing 162, and a second inlet 176 is provided in the second valve housing 189 that is also in fluid communication with the transfer port 140 and barrel housing 162.

The barrel housing 162 and barrel 164 serve as a flow director capable of directing the flow of fluid to either one or both of first and second valve inlets 168, 176 and ultimately to the valve housings 172, 178. The barrel member 164 includes a lower portion that comprises an interiorly disposed fluid directing valve portion 202, and an exteriorly disposed stud-like, rectangular cross sectional level lever engaging portion 206. The lower fluid directing portion includes a shaped surface 210 for defining a fluid pathway 212 through which fluid can be directed to flow only into the first valve inlet 168, or alternately into only the second valve inlet 176.

In this regard, the barrel 164 can be rotated within the barrel housing 162 about the long axis of the barrel member 164 between a first position wherein fluid is directed to flow only into the first valve inlet 168, and a second position wherein fluid is directed to flow only to the first and the second valve inlet 176. An O-ring 216 is provided for maintaining fluid within the appropriate flow path in the barrel housing 162 and serving as a seal for preventing fluid from leaking out of the barrel housing 162.

The barrel member 164 is rotatable or pivotable within the barrel housing 169 and is movable between a first position and a second position. Movement is effected by the lever engaging stud portion 206 of the barrel member 164 being inserted within an interior receiving cavity 220, of a lever 222 that is especially designed to receive the stud-like flat of the lever receiving portion 206 of the barrel member 164. The handle or "lever" 222 includes a first barrel engaging 226 portion that includes the stud receiving aperture 220 and a second hand engaging portion 228 that is engaged by the user to move the lever 222 and hence the lever 164 passageway.

The user engaging portion 228 is a generally rectangularly shaped to make it easy for the user to pivot the lever 227 and therefore, move the fluid directing barrel 164 between the first position and the second position, so that the user can selectively change the direction of fluid flow between flow to the first valve housing 172 and through the first valve 192; or else, to flow to the second valve housing 178 and through the second valve 198.

When the flow director barrel 164 is in the first position, fluid that flows between the valve housing and the shock absorber 36 is directed to flow only through the first inlet 168 and into the first valve housing 172. When the flow director 164 is moved into the second position, fluid is prevented from flowing through the first inlet 168 and into the first valve housing 172. Rather, fluid is directed solely into the second inlet 176 and into the second valve housing 178.

As such, when the flow director 164 is in the first position, fluid flows through the first valve assembly 194, 168, 172, so that the flow rate of fluid through the shock absorber 36, and hence the damping rate of the shock absorber 36 is controlled by the first valve 194. When the flow director 164 is in the second position, the fluid moves through the second valve inlet 176, second valve housing 178 and second valve member 198 so that the flow rate and hence damping rate is controlled by the second valve member 198.

Turning now to the first 194 and second 198 valve members, it will be noted that the first valve member 194 includes an annular relatively reduced diameter area or portion 232 that is disposed at the same general axial position as the first inlet 168. Similarly, the second valve member 198 includes an annular reduced diameter portion 236 that, when the second valve member 198 is inserted into the second valve housing 186, positions the reduced diameter portion in a directly opposed relation with a second inlet.

When so positioned, the reduced diameter portions 232, 236 provide an annular inlet flow passageway into which fluid can flow into the area defined between the radially inwardly facing surface of the valve housings 172, 178 respectfully, and the radially outwardly facing surface of the reduced diameter portions 232, 236 at an axial position that is adjacent to the valve member inlets (not shown, 242) and valve housing inlet.

It will be noted that the second valve member 198 includes a second inlet aperture 242 that is formed in the reduced diameter portion 236 of the second valve member 192. A similar first inlet aperture is disposed within the reduced diameter portion 232 of the first valve member 194, but is not shown in the drawing.

The valve member inlet apertures (not shown) 242, enable fluid that is contained within the annular fluid inlet flow passageway of the valve housing (formed by the reduced diameter portions 232, 230) to flow into the interior of the valve members 194, 198. The interior of the valve members 194, 198 may include one or more apertures, passageways and/or valves that control the flow of fluid through the interior of the valve member, as the fluid passes from the inlet aperture (not shown) 242 of the valve member 194, 196, and moves axially downwardly (as shown in the drawings) to a point wherein the fluid can exit out of the lower portion of the valve outlet housing.

The first valve member 194 and second valve member 198 each include relatively enlarged diameter cap portions 256, 258 respectively that are disposed above the reduced diameter portions 232, 236. The cap portions 256, 258 are provided for sealing the valve housing assembly to maintain fluid within the valve housings 172, 189. When assembled, the lower surfaces of the cap portions 256, 258 should rest upon the upper surface 260 of the controller 34 housing 120. If desired a gasket member, gasket material, or other seal type item or material can be placed between the underside surfaces of the cap portions 256, 258 and the upper surface 260 of the controller housing 34

Each of the first and second valve members 194, 198 includes a first (primary) valve adjuster 264, 266 respectively for controlling the rate of flow of fluid through the primary compressor valves within each of the first and second valve members 194, 198. Preferably, the flow rates are highly variable through the adjustment of the primary valve adjuster to provide the user with a wide range of settings for the compression force exerted by the shock absorber 36.

Each of the first and second valve members 194, 198 includes a second (by pass) valve adjuster 270, 272 for controlling the flow of fluid through the bypass valves pathways and bypass compression valve within each of the first and second valve members 194, 198. Preferably, the flow rates (and hence damping rates) are highly variable through the adjustment of bypass valve adjusters 270, 272, to provide the user with a range of settings for the compressive force exerted by the shock absorber 36 and hence the damping rate of the shock absorber 36.

The variability of the damping rate is enhanced by the fact that a first level of variability is provided by the user to be able to employ the lever 222 to select between the first and second valve members 194, 198. A second level of variability exists for each valve member 194, 198 through the user's ability to adjust the fluid flow through the primary flow path with primary path first adjusters 264, 266. A third level of variability exists for each for each valve member 194, 198 through the user's ability to adjust the fluid flow through the bypass flow path with the second (bypass) adjusters 270, 272.

The valve adjustment members 264, 266, 270, 272 are disposed exteriorly of the valve members 194, 1.98 and valve housings 172, 178 to permit the user to gain access to them. The adjustment members 264, 266, 270, 272 are positioned to extend axially upwardly from the valve members 194, 198.

The valve adjustment members include the relatively taller bypass valve adjustment members 270, 272 that comprise upstanding stud-like members that are each centrally disposed on the caps 256, 258 and extend axially outwardly therefrom. The primary valve adjusters 264, 266 comprise flow rate (or damping rate) valve adjustment members that in FIG. 1C are shown as a hex-sided hollow threaded bolt like member, that contains a hollow interior into which the bypass valve and adjusters 270, 272 are received.

The valve adjustment members 264, 266, 270, 272 themselves operate similarly to their corresponding components in the prior art valves discussed above in the Background of the Invention. In particular, the compression adjusting valve adjustment members 264, 266 control the rate at which fluid can flow through the primary flow path of the valve members 194-198, and thereby controls the damping force that is exerted by the shock absorber 36.

The primary compression rate adjusters 264, 266 have a limited range to which they can vary the flow of fluid through the valve. As such, when a significantly greater amount of fluid flow is necessary to achieve a low compression damping, the bypass passageways are opened to permit significantly greater fluid flow through the valves 194, 196, to thereby provide greater wheel travel and a softer rider. As discussed above, the bypass valves can be moved between a closed position and one or more (perhaps infinite) open positions.

As such, when a compression valve (primary valve flow path) is open (which it always is to some extent), and the bypass valve is closed, the fluid has basically one path to flow through the valve. However, when the bypass valve (270, 272) is open, the fluid has two paths to flow through the valve (194, 198), to thereby permit more fluid to flow through the valve 194, 198, to thereby make the ride softer. The question of whether one opens the bypass valve depends on whether one is seeking a high compression (high damping force ride), or a low compression (low damping force ride). If one wants a high damping force ride, one closes the bypass valve and opens the primary path compression 264, 266 to the desired rate to provide the desired ride. In contrast, if one wants low damping force to allow greater play in the wheel and a "softer rid," one opens both the compression valve to a desired state, and also opens the bypass valve.

This variability is in addition to the variability provided by the user's ability to choose between the first 194 and second valves 198. It is envisioned that most users will adjust the primary and bypass flow rates of one of the valves (e.g. first valve member 194) to serve as the "go-to" valve member when the rider wants a high compressive force ride, such as when riding uphill; and will adjust the primary and bypass flow rates of the other valve member (e.g. second valve 198) to serve as the "go-to" valve member when the rider wants a low compression force ride, such as when riding downhill, or over especially bumpy terrain.

It is also possible to increase variability of the flow rates by providing different set ups for the valve members. For example, the diameter of the apertures of the primary flow path may be different for different models of the valve member. It is envisioned that a different set up will be requested from customers, both because of differences in user preferences and also differences in users' sizes and weights, and shock absorber 36 choices.

Fluid that enters the valve members' 194, 198 interior passageway flows into the valve inlet 242 and out of the valve outlets 248, 250, at the distal ends of the first and second valves 194, 198 (depending upon which one of the valves that the fluid is being directed to), and then flows through a valve outlet passageway 280, referred to the reservoir input port 284 that comprises the downstream end of the valve outlet passageway 280. The reservoir inlet port 284 is in fluid communication with both the interior of the valve housings 172, 178 and the reservoir 288.

As shown in FIG. 1C, the reservoir cap 292 is generally similar in configuration to the shock connector cap 128, and has a shape and operational ability that is similar to a bottle screw cap, with the exception of the inlet port 284 that is in the reservoir cap 292. A larger "bottle" shaped reservoir body member is threadedly engagable to the reservoir cap 292, so that a reservoir of a desired size is provided. One can see the engaged reservoir connector and reservoir bottle in FIGS. 1A, 1B and 5 upon an examination of the reservoir portion of the assembly.

In operation, the damping controller device 34 is assembled and is affixed onto a bicycle as shown in FIGS. 1A and 1B. If not done already, one then inserts the first valve member 194 into the first valve housing 172, and threadedly engages the male threads 190 of the first valve member 194 with the female threads 186 of the first valve housing 172.

The first 194 and second 198 valves are then adjusted as desired by the user. As stated above, the first valve 194 is adjustable completely independently from the second valve 198 and the primary valve adjuster of each valve member 194, 198 is independently adjustable from the respective bypass flow paths of each valve member 194, 198. In one example, the user may desire to use the first valve member 194 and valve housing 172 as his high damping force "uphill" "go-to" valve then use the second valve member 198 and valve housing 178 as the low damping force "downhill" valve As this first valve 194 is being used as the high damping force valve, one would likely adjust the primary path flow adjuster 264 to open the compression valve to its desired position, and close the bypass valve by rotating the bypass valve adjuster 270 to a closed position.

As the second valve 198 is then being used as the lower damping compression force valve, one would use the primary path adjuster 266 to open the primary path compression valve of the second valve 198 to its desired position that may or may not have any relation to the position at which the first valve's compression valve is set. Then the bypass valve adjuster 272 would be moved to open the bypass pathway to the extent desired so that it permits fluid to pass there through.

Prior to the reservoir body 288 being joined to the reservoir cap 292, an appropriate amount of fluid is placed in the reservoir body 288. In a similar manner, an appropriate amount of reservoir fluid should also be placed into the cylindrical housing/reservoir of the shock absorber housing 36.

Before riding, one places the lever 222 in either the first position to direct fluid to flow into the first inlet and first valve 194, and thereby be controlled by the first valve 194, or into the second position. In the second position, the fluid directing portion of the barrel 164 directs fluid to flow into the second valve housing 178 and through the second valve 198 to thereby cause the flow of shock absorber fluid to be controlled by the operation of the second valve 198.

If one hypothetically were starting her race over a smooth surface or riding uphill, the lever of the damping controller would be placed in the first position to place the valve in the "high damping compression force mode" that reduces the freeness of the travel of the wheel, and provides a stiffer ride, while providing greater efficiency of movement of the bike. The user then continues riding in this high damping compression force mode until she desired to change, such as when she reached the apex of the hill, or was riding over rougher surface and especially when riding over rougher surface downhill. At this point, the user reaches down, and flips the lever 222 into the second position so that the flow of fluid in the shock absorber is controlled by the second valve 198.

When in the first position, fluid is directed to flow through the first inlet 168, but is not generally permitted to flow through the second inlet 176 and through the second valve 198. However, when the user flips the switch into the second position, flow through the first valve 194 and first inlet 168 are cut off so that the fluid no longer flows through the first inlet 168 of the first valve 194.

Rather, the lever 222 and barrel 164 assembly direct the fluid to flow to a second inlet 176 and into the second valve housing 178 so that the shock absorber fluid flows through the second valve 198. As discussed in the hypothetical configuration above, since the second valve 198 is in the soft ride or lowered damping compression force mode, the second valve 198 allows a greater amount of fluid to flow through the valve 198 (when compared to the first valve 194), to thereby provide for a softer ride that permits greater travel of the frame members with respect to each other because of the greater and freer travel of the shock absorber 36.

Although various embodiments have been described as having particular features and/or combinations of components, other embodiments are possible having a combination of any features and/or components from any of embodiments as discussed above. As used in this specification, the singular forms "a," "an" and "the" include plural referents unless the context clearly dictates otherwise.

While the invention has been illustrated and described in detail in the drawings and foregoing description, the same is to be considered as illustrative and not restrictive in character, it being understood that all changes and modifications that come within the spirit of the invention are desired to be protected.

What is claimed:

1. A controller for adjusting the damping characteristics of a vehicle shock absorber containing a shock absorber housing and shock absorber fluid contained within the shock absorber housing,
the controller comprising;
a controller housing having a fluid passageway therein, the housing including a shock coupler for coupling the housing to the shock absorber housing and for placing the shock absorber housing in fluid communication with the fluid passageway,
a reservoir for storing a reservoir of shock absorber fluid in the controller,
a first valve disposed in the fluid passageway between, the shock coupler and the reservoir through which shock absorber fluid can pass between the shock coupler and the reservoir, the first valve including a first valve controller configured for controlling the rate of flow through the first valve to achieve a first damping rate, the first valve controller including a first flow path having a cross sectional area and a first flow path adjuster for varying the cross sectional area of the first flow path, and a second flow path having a second flow path adjuster for varying the cross sectional area of the second flow path, the first flow path adjuster and the second flow path adjuster being independently operable,
a second valve disposed in the fluid passageway between the shock coupler and the reservoir through which shock absorber fluid can pass between the shock coupler and the reservoir, the second valve including a second valve controller for controlling the flow of shock absorber fluid through the second valve to achieve a second damping rate, the second valve controller including a first flow path having a cross sectional area and a first flow path adjuster for varying the cross sectional area of the first flow path, and a second flow path having a second flow path adjuster for varying the cross sectional area of the second flow path, the first flow path adjuster and the second flow path adjuster being independently operable, and
a flow director for directing the flow of shock absorber fluid to either the first valve or the second valve to achieve one of the first or second damping rates,
wherein the flow controller of the first valve controls the flow of shock absorber fluid to achieve the first damping rate independently of the control exerted by the second valve over the flow of shock absorber fluid to achieve the second damping rate.

2. The controller of claim 1 wherein each of the first and second adjusters of the first valve are configured for variably adjusting the flow rate through the respective first and second first valve flow paths of the first valve to permit the user to adjust the flow of fluid to any of a plurality of settings.

3. The controller of claim 2 wherein at least one of the first and second adjusters of the first valve is capable of shutting off the flow of shock absorber fluid through its respective first or second first valve flow path of the first valve.

4. The controller of claim 1 wherein the shock absorber fluid comprises at least one of a liquid shock absorber fluid, hydraulic fluid and a gaseous shock absorber fluid.

5. The controller of claim 1 wherein the controller housing includes a cap member having an interior, the cap member configured for being coupled to the shock absorber housing to place the interior of the cap member in fluid communication with the shock absorber fluid contained within the shock absorber housing.

6. The controller of claim 1 wherein the flow director includes a hollow flow director receiving cavity, a flow director disposed within the flow director receiving cavity and a user actuable handle operatively coupled to the flow director and disposed exteriorly of the flow director receiving cavity.

7. The controller of claim 6 wherein the flow director is movable by the handle between a first position wherein the flow director directs shock absorber fluid to the first valve, and a second position wherein the flow director directs fluid to the second valve.

8. The controller of claim 6 wherein the flow director is generally cylindrical and includes a flow surface for selectively directing the flow of fluid through the flow director receiving cavity to the first and second valves, and a handle receiving portion for receiving the user actuable handle for permitting the user to move the user actuable handle to move the flow director surface between a first position wherein the flow director surface directs shock absorber fluid to the first valve, and a second position wherein the flow director surface directs shock absorber fluid to the second valve.

9. The controller of claim 1 wherein the fluid passageway includes an interior of the shock coupler, a flow directing receiving cavity for receiving the flow director, a transfer port for transferring fluid between the shock coupler and the flow director receiving cavity, a first valve receiving cavity for receiving the first valve, a valve inlet for carrying shock absorber fluid between the flow director cavity and the first valve receiving cavity, a reservoir, and a valve outlet passageway for carrying shock absorber fluid between the first valve receiving cavity and the reservoir.

10. The controller of claim 9 wherein the fluid passageway includes a second valve receiving cavity for receiving the second valve.

11. The controller of claim 1 wherein the first and second flow paths of the first valve are arranged in parallel so that the amount of shock absorber fluid that is allowed to flow through the first valve is determined by the addition of the amount of shock absorber fluid that the second adjuster allows to flow through the second flow path of the first valve to the amount of shock absorber fluid that the first adjuster allows to flow through the first flow path of the first valve.

12. A controller for adjusting the damping characteristics of a vehicle shock absorber containing a shock absorber housing and shock absorber fluid contained within the shock absorber housing, the controller comprising;
    a controller housing having a fluid passageway therein, the housing including a shock coupler for coupling the housing to the shock absorber housing and for placing the shock absorber housing in fluid communication with the fluid passageway,
    a reservoir for storing a reservoir of shock absorber fluid in the controller,
    a first valve disposed in the fluid passageway between the shock coupler and the reservoir through which shock absorber fluid can pass between the shock coupler and the reservoir, the first valve Including a first flow path and a second flow path, a first valve adjuster configured for controlling the rate of flow through the first flow path and a second valve adjuster configured controlling the rate of flow through the second flow path, the first valve controller including a first flow path having a cross sectional area and a first flow path adjuster for varying the cross sectional area of the first flow path, and a second flow path having a second flow path adjuster for varying the cross sectional area of the second flow path, the first flow path adjuster and the second flow path adjuster being independently operable,
    a second valve disposed in the fluid passageway between the shock coupler and the reservoir through which shock absorber fluid can pass between the shock coupler and the reservoir, the second valve Including a first flow path and a second flow path, a first valve adjuster configured for controlling the rate of flow through the first flow path and a second valve adjuster configured controlling the rate of flow through the second flow path of the second valve, and
    a flow director for directing the flow of shock absorber fluid to either the first valve or the second valve to achieve one of the first or second damping rates,
    wherein each of the first and second adjusters of each of the first and second valves are Independently controllable to provide four independent adjustments of the damping characteristics of the vehicle shock absorber.

13. The controller of claim 12 wherein the fluid passageway includes an interior of the shock coupler, a flow directing receiving cavity for receiving the flow director, a transfer port for transferring fluid between the shock coupler and the flow director receiving cavity, a first valve receiving cavity for receiving the first valve, a valve inlet for carrying shock absorber fluid between the flow director cavity and the first valve receiving cavity, a reservoir, and a valve outlet passageway for carrying shock absorber fluid between the first valve receiving cavity and the reservoir.

14. The controller of claim 12 wherein the first and second flow paths of the first valve are arranged in parallel so that the amount of shock absorber fluid that is allowed to flow through the first valve is determined by the addition of the amount of shock absorber fluid that the second adjuster allows to flow through the second flow path of the first valve to the amount of shock absorber fluid that the first adjuster allows to flow through the first flow path of the first valve.

15. The controller of claim 12 wherein the controller housing includes a cap member having an interior, the cap member configured for being coupled to the shock absorber housing to place the interior of the cap member in fluid communication with the shock absorber fluid contained within the shock absorber housing.

16. The controller of claim 12 wherein the flow director includes a hollow flow director receiving cavity, a flow director disposed within the flow director receiving cavity and a user actuable handle operatively coupled to the flow director and disposed exteriorly of the flow director receiving cavity.

17. The controller of claim 16 wherein the flow director is movable by the handle between a first position wherein the flow director directs shock absorber fluid to the first valve, and a second position wherein the flow director directs fluid to the second valve.

18. The controller of claim 16 wherein the flow director is generally cylindrical and includes a flow surface for selectively directing the flow of fluid through the flow director receiving cavity to the first and second valves, and a handle receiving portion for receiving the user actuable handle for permitting the user to move the user actuable handle to move the flow director surface between a first position wherein the flow director surface directs shock absorber fluid to the first valve, and a second position wherein the flow director surface directs shock absorber fluid to the second valve.

19. The controller of claim 12 wherein the fluid passageway includes an interior of the shock coupler, a flow directing receiving cavity for receiving the flow director, a transfer port for transferring fluid between the shock coupler and the flow director receiving cavity, a first valve receiving cavity for receiving the first valve, a valve inlet for carrying shock absorber fluid between the flow director cavity and the first valve receiving cavity, a reservoir, and a valve outlet passageway for carrying shock absorber fluid between the first valve receiving cavity and the reservoir.

20. The controller of claim 15 wherein the first and second flow paths of the second valve are arranged in parallel so that the amount of shock absorber fluid that is allowed to flow through the second valve is determined by the addition of the amount of shock absorber fluid that the second adjuster allows to flow through the second flow path of the second valve to the amount of shock absorber fluid that the first adjuster allows to flow through the first flow path of the second valve.

* * * * *